Figure 2:
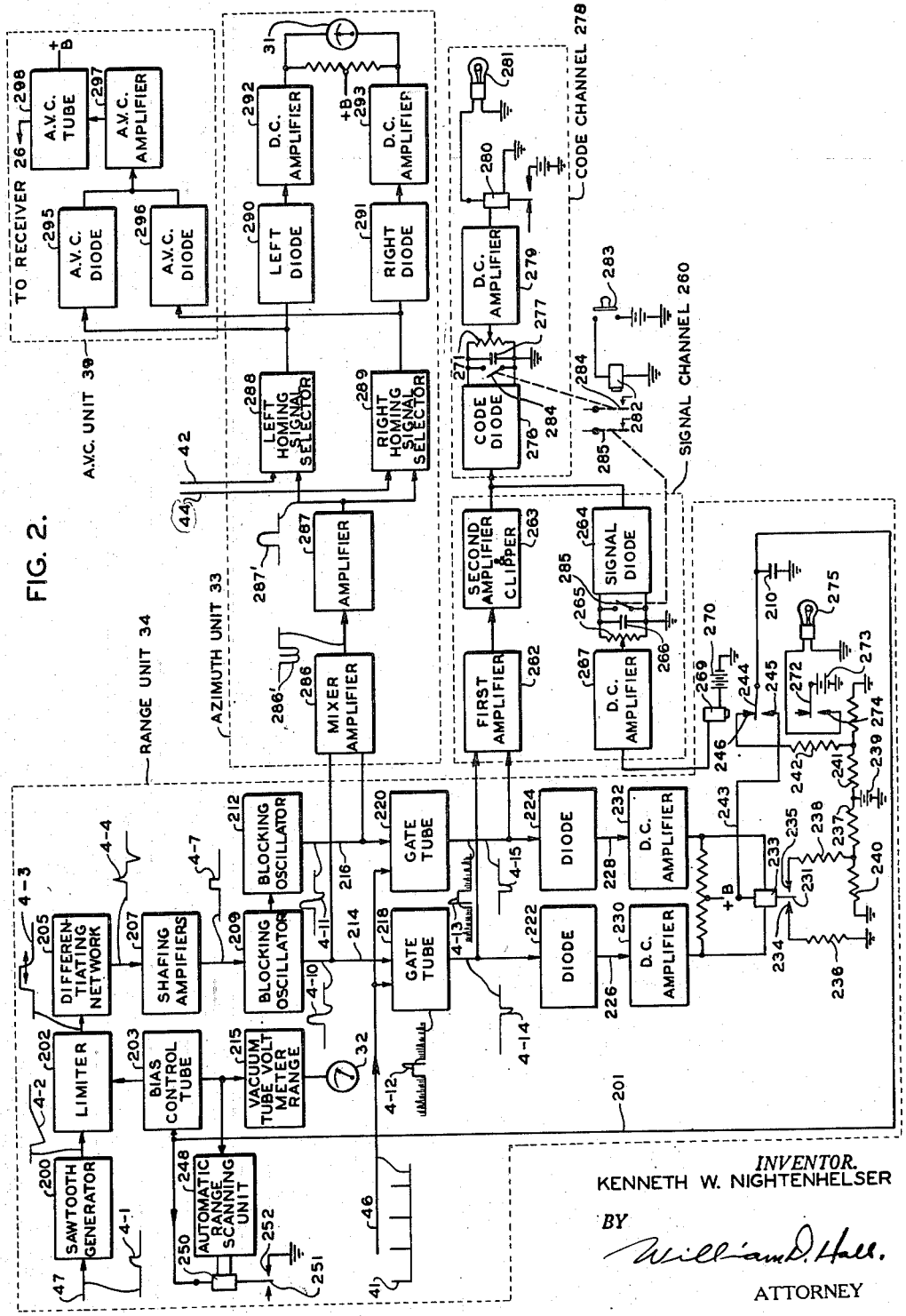

Feb. 10, 1953  K. W. NIGHTENHELSER  2,628,349
HOMING SYSTEM
Filed Sept. 13, 1944  3 Sheets-Sheet 1
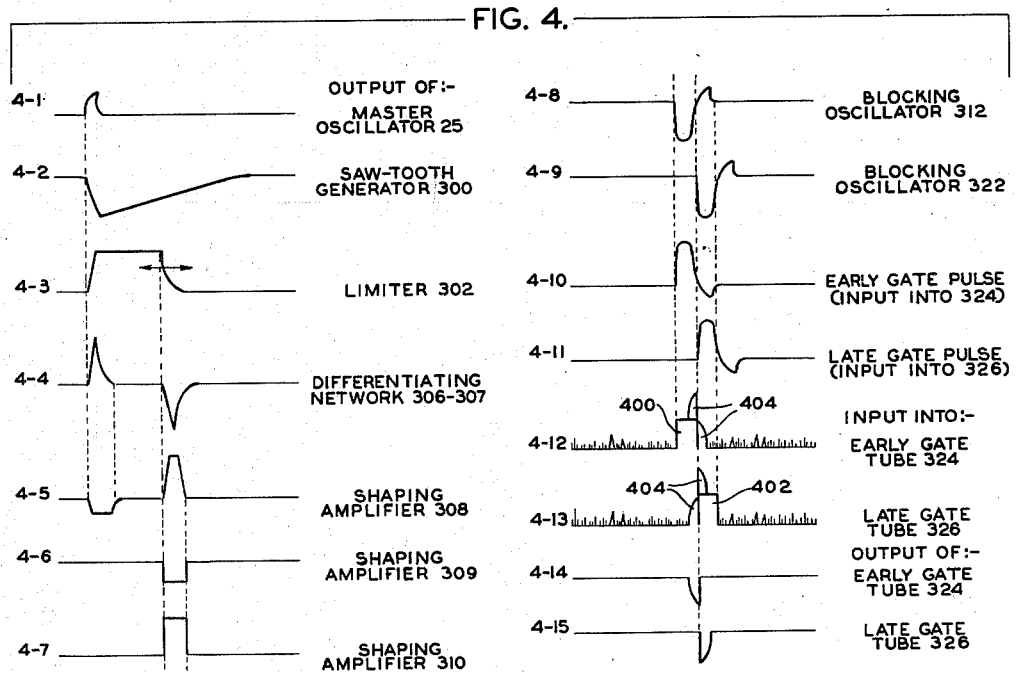
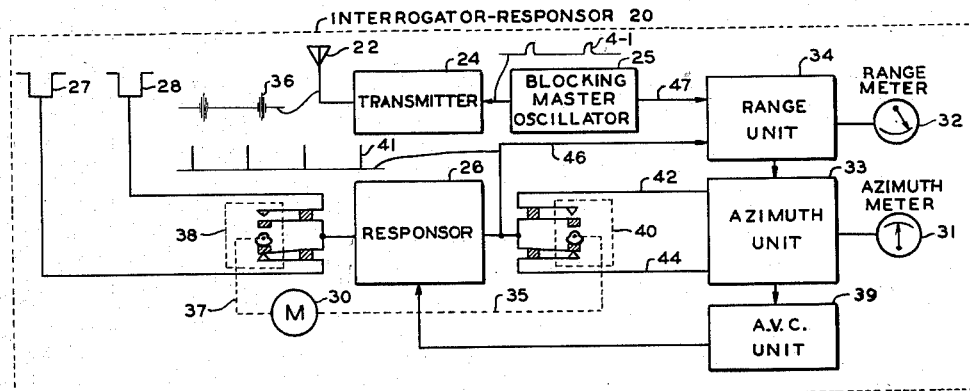
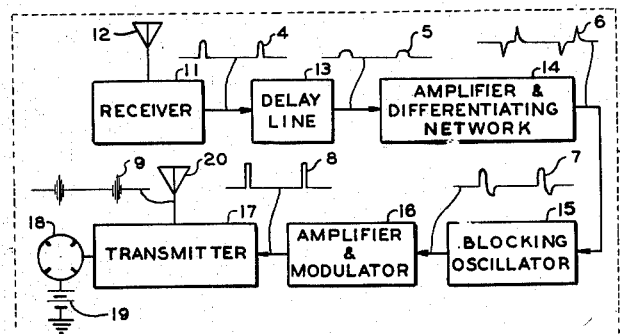
*INVENTOR.*
KENNETH W. NIGHTENHELSER
BY
*William D. Hall.*
ATTORNEY Feb. 10, 1953 K. W. NIGHTENHELSER 2,628,349
HOMING SYSTEM
Filed Sept. 13, 1944 3 Sheets-Sheet 2

INVENTOR.
KENNETH W. NIGHTENHELSER
BY
William D. Hall.
ATTORNEY

Feb. 10, 1953 K. W. NIGHTENHELSER 2,628,349
HOMING SYSTEM
Filed Sept. 13, 1944 3 Sheets-Sheet 3

*INVENTOR.*
KENNETH W. NIGHTENHELSER
BY *William D. Hall.*
ATTORNEY

Patented Feb. 10, 1953

2,628,349

UNITED STATES PATENT OFFICE 2,628,349

HOMING SYSTEM

Kenneth W. Nightenhelser, Dayton, Ohio

Application September 13, 1944, Serial No. 553,859

12 Claims. (Cl. 343—6)

(Granted under Title 35, U. S. Code (1952), sec. 266)

The invention described herein may be manufactured and used by or for the Government for governmental purposes, without the payment to me of any royalty thereon.

This invention relates to radio direction finders and, more particularly, to a radio direction finding system which is capable of furnishing azimuth and range indications on two meters, one meter indicating the azimuth, and the other the range of the system with respect to a beacon station.

The invention is disclosed in connection with a remotely controlled beacon station which is controlled by the signals transmitted for this purpose by the direction finder. The beacon systems of this type are known as interrogator-responsor-transponder beacon systems. Such a system includes a transmitter, called an interrogator, and a "homing" receiver, called a responsor, carried by an airplane, or any other object the position of which is determined with respect to the beacon, and a transmitter-receiver combination known as a transponder, the latter being located at a landing field when the system is used as a homing device for airplanes. When the pilot of airplane seeks to "home" on the beacon, he transmits interrogating signals, comprising pulsed radio frequency energy, which, upon their reception at the transponder, trigger the transmitter thereof to radiate "homing" signals also of pulsed radio frequency type. These signals are received at the airplane by the "homing" receiver, or responsor, the output of which is used to guide the plane to the landing field.

The invention relates to the instruments which are connected to the responsor, these instruments enabling the pilot to control the flight of the plane to the landing field.

Since the widest use of the interrogator-responsor systems today is aboard airplanes, their functioning must be adapted to such use. One of the peculiarities of such use resides in the fact that it becomes very desirable to furnish all indications on the instruments of the dial type since pilots are accustomed to, and insist upon, indicating instruments of this type. The invention discloses circuits terminating in a zero center-scale dial meter providing azimuth deviations from a direct flight to a beacon station, the meter being very well suited for mounting on the instrument panel of an airplane. The invention also discloses circuits terminating in a range meter, also of the dial type, this meter indicating the distance in miles between the airplane and the beacon station, or transponder. Circuits are also provided for identifying the transponder, and for indicating to the pilot whether the responsor is receiving any beacon signals at any given time. In order to make the operation of all circuits fully automatic, additional circuits are also provided for continuous, periodic scanning of the available range by an automatic range scanning unit, and for automatically locking the range measuring unit on a beacon signal when such signal is received. Since several transponders may be involved in the operation of the system of this type, circuits are also provided for unlocking the range measuring unit should it lock itself on an undesired beacon signal signal so that the scanning cycle may be resumed once more until the range unit locks itself on the desired beacon signal. Pulse communication is used throughout the system, and all circuits are made to operate on pulse signals.

Range determinations are accomplished by continuously measuring the time intervals between the transmission of an interrogating pulse for actuating the transponder and the reception of the homing signal. The ranging circuit and its meter are calibrated to give the range distance in miles on the dial of the meter. Periodic searching of the available range is accomplished by charging and discharging a condenser, the charge appearing on the condenser being used for indicating the range position of the system during its searching cycle, as well as during its automatic range determinations cycle. When a beacon signal is received, circuits are actuated which disconnect the automatic range scanning unit and transfer control over the range meter to the range measuring unit. The latter incorporates circuits which automatically maintain proper range indications on the meter, continuously giving the pilot the distance separating him from the transponder. The pilot is notified which transponder is operating the range determining unit by means of a pilot light which follows the code combinations transmitted by the transponder, the code combinations energizing and deenergizing the code light mounted on the same panel with the meter. If the transponder has been identified as one of the undesired beacons, means are provided for unlocking the system, this unlocking immediately restoring the searching cycle of the system. Upon the locking of the system on the desired beacon signal, the operator is at once advised of the range existing between him and the beacon station.

The azimuth meter consists of a zero center scale meter, the deviations of which from its center position indicate in degrees the deviation of the direction of flight of the plane from the "on beacon course." The azimuth meter is connected through intermediate circuits and the responsor to two directional homing antennas, the axes of the antenna lobes forming two small angles with the longitudinal axis of the plane so that only small portions of the lobes overlap each other. This "double-tracking" lobe pattern is used for receiving homing beacon signals, and, depending upon the orientation of the lobe patterns with respect to the plane of the incoming radio wave, the amplitudes of the radio signals on the two antennas are equal when the mean lobe axis points directly at the beacon station, and unequal when the mean axis deviates from this course. The amplitudes of the beacon signals, as received by the two antennas, are compared in two parallel channels which terminate in two balanced direct current amplifiers, the azimuth meter being connected across the output circuits of the D. C. amplifiers. When the amplitudes of the signals picked up by the two antennas are equal, no potential is impressed across the meter, and the meter reads zero; when the amplitudes of the signals received by the antennas are unequal, the meter will at once register a deflection which is approximately proportional to the degree of deviation from the "on beacon course"; the direction of this deviation is also indicated on the meter.

It is, therefore, the principal object of my invention to provide azimuth and range indicating circuits for a responsor in the interrogator-responsor-transponder homing system.

Another object of my invention is to provide an automatic range-scanning circuit in the system of the above mentioned type, which continuously scans the available range until a beacon signal is intercepted whereupon the system locks itself on the intercepted beacon signal.

Still another object of my invention is to provide code and signal channels, the code channel providing visual indication of the code transmitted by the transponder, while the signal channel furnishes a visual indication of whether the homing system is receiving and is locked on any beacon signal.

An additional object of my invention is to provide an A. V. C. system which controls the sensitivity of the responsor only by means of the selected beacon pulses, all other signals being suppressed so that they have no effect on the sensitivity of the responsor and its A. V. C. circuit.

The novel features which I believe to be characteristic of my invention are set forth with particularity in the appended claims. My invention itself, however, both as to its organization and method of operation, together with the objects and advantages thereof, may best be understood in connection with the following description and accompanying drawings in which:

Figure 1 is a block diagram of the entire interrogator-responsor-transponder system, and a simplified block diagram of the azimuth and range meters and A. V. C. circuit connected to the responsor.

Figure 3:
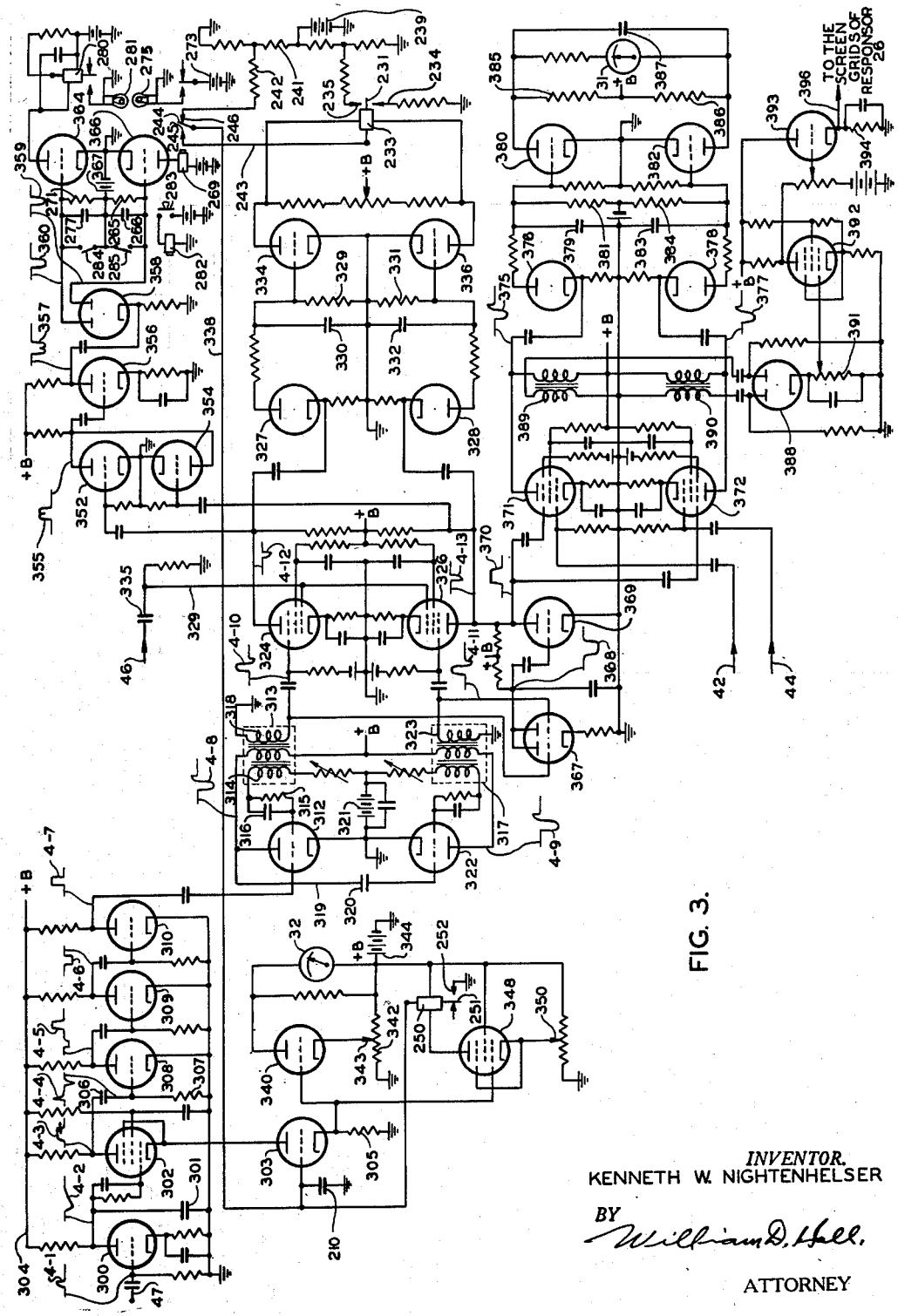

Figure 2 is a block diagram of the azimuth, range, searching, locking, unlocking and A. V. C. circuits, Figure 3 is a schematic diagram of Fig. 2, and Figure 4 illustrates the oscillograms of some signals appearing in the ranging unit.

Referring to Fig. 1, a transponder, or beacon station, 10, which may be either a moving or a stationary station, includes a receiver 11, connected to a nondirectional receiving antenna 12, and a transmitter 17, the latter being actuated by the interrogating signal appearing in the output of receiver 11, the two being interconnected by means of a delay line 13, an amplifier 14, a blocking oscillator 15 and an amplifier-modulator 16. The transponder's transmitter 17 is equipped with a nondirectional antenna 20 and a code wheel 18, the latter being interposed between a grounded source of potential 19 and a plate circuit of an oscillator in transmitter 17. The "homing" apparatus which is installed on the plane, or any other object the azimuth and range of which are sought with respect to transponder 10, is an interrogator-responsor 29 which includes an interrogating transmitter 24 connected to a nondirectional antenna 22, a master oscillator 25, a responsor 26, two directional receiving antennas 27, 28, a motor 30 connected with the two ends, 35 and 37, of its shaft to the cams of cam switches 38 and 40, a range unit 34, an azimuth unit 33, a range meter 32, an azimuth meter 31, and an A. V. C. unit 39. The functioning of the system illustrated in Fig. 1 is as follows:

Master oscillator 25, as a rule, consists of a blocking oscillator which generates a series of periodic control pulses 4—1 which are impressed on transmitter 24. The transmitter periodically transmits the interrogating radio frequency pulses 36, the periodicity of which is controlled by the control pulses 4—1. The duration of the control pulses 4—1 may be, for example, in the order of five microseconds, and they may be spaced three thousand microseconds apart. The system is not limited to any specific width of the transmitted pulses, nor is it limited to any specific keying frequency of blocking oscillator 25, and the functioning of the system as a matter of fact may be enhanced when much narrower pulses, in the order of one microsecond, are generated by transmitter 24, as will be explained later in the concluding paragraphs of this specification. The interrogating pulses 36 are transmitted by means of antenna 22, and are received at transponder 10 by receiving antenna 12, the latter impressing them on receiver 11, the receiver being of a superheterodyne type and transforming the RF signals into video signals 4. These are impressed on delay line 13 which alternates and delays the pulses 4, so that they appear as pulses 5 in the output of the delay line. These are impressed on amplifier and differentiating network 14, the output of the latter consisting of positive and negative pulses 6. The positive pulses are used to trigger blocking oscillator 15 whose output is illustrated at 7. The positive delayed pulse appearing in the output of blocking oscillator 15 is amplified in amplifier and modulator 16 which impresses a correspondingly delayed keying pulse 8 on the oscillator in transmitter 17, unblocking the oscillator in transmitter 17 for the duration of the rectangular pulse 8. In response to the interrogating pulses 36 transmitter 17 transmits pulses 9, the duration of which corresponds to the duration of the rectangular pulses 8, while their timing is controlled by the pulses 4—1 generated by master oscillator 25 in the interrogator. This continuous series of RF pulses 9 is occasionally interrupted by a motor-driven code wheel 18 which disconnects the source of plate potential 19 from the oscillator, in a coded manner thus identifying the transponder for the airplane. The delay line 13 and associated amplifier and differentiating network 14 are used for delaying the pulses transmitted by transmitter 17 to insure proper short range indications.

The messages transmitted by antenna 20 are picked up by the two directional antennas 27 and 28 connected to the input circuit of responsor 26 through cam switch 38, switch 40 being connected to the output circuit of responsor 26. Switch 38 alternately connects one antenna at a time to the responsor, so that its output consists of a series of pulses received, first, by antenna 27, and then by antenna 28. The relative amplitudes of these pulse series are determined by the angular position of the antennas with respect to the source of radiated energy, or antenna 20. Since the rotation of the two switches 38, 40 is synchronized by the common shaft of motor 30, the signals received by antenna 27 are impressed on a conductor 44, and the signals received by antenna 28 are impressed on a conductor 42 of azimuth unit 33. An additional conductor 46 is used for connecting the entire, unswitched video output of the responsor to range unit 34. The range unit is also connected to blocking master oscillator 25 over a conductor 47. The outputs of the azimuth and range units are connected to their respective azimuth and range meters 31 and 32. The transmitter-receiver combinations 10 and 20 per se do not comprise a part of this invention, and, therefore, need no additional description. They, as mentioned previously, represent the remotely controlled beacon system, known as interrogator-responsor-transponder system. For a more detailed description of a suitable transponder 10, reference is made to a patent application of Gerard C. Hess, titled "Signal Responsive System," Serial No. 547,242, filed July 29, 1944, and issued as Patent No. 2,532,307 on December 5, 1950.

The invention itself resides in the azimuth and range units 33, 34, their meters 31, 32, the A. V. C. unit 39, and the coordination of their functional cycle with the normal functional cycle of the interrogator-responsor-transponder system so that the new and the known elements function as a single, integrated system. The range, azimuth and A. V. C. units, their circuits, as well as their functioning, will be described in connection with their block and schematic diagrams, Figs. 2 and 3, and the oscillograms illustrated in Fig. 4.

Referring now to Fig. 2, the range unit 34 is illustrated in the left portion of Fig. 2, the azimuth unit 33 in the center of Fig. 2, the code and signal channels 278 and 260 are shown directly below the azimuth channel, and the A. V. C. unit 39 in the upper right corner of Fig. 2. The range unit will be described first, and it will be followed with the description of the block diagram of the azimuth and A. V. C. units.

The oscillograms of the signals appearing in the range circuit are illustrated in the Figs. 2, 3 and 4, where they are similarly numbered, Fig. 4 illustrating the signals in their proper time relationship with respect to each other.

Before proceeding with a more detailed description of the block diagram of the range unit, a brief functional cycle will be given first in order to aid the understanding of the detailed description that is to follow.

The block diagram of the range unit begins with the conductors 46 and 47, which correspond to the similarly numbered conductors illustrated in Fig. 1. As may be recalled from the description of Fig. 1, conductor 47 connects the range unit to the blocking oscillator 25, and conductor 46 connects it to the unswitched output of receiver 26.

Conductor 47 receives periodic pulses 4—1 from the master blocking oscillator 25, the pulses being used for timing all circuits in the range unit 34. If slight delays introduced by the circuits of the transmitters 24, 17 and the receivers 11, 26 are neglected, the appearance of the rectangular pulses 4—1 in the range unit may be considered as a signal identifying zero time instant for all range determinations. Since all range determinations by means of the available electrical systems are obtained by measuring the time intervals between the transmission of an interrogation pulse, which is pulse 36 in the subject system, and the reception of a response pulse, which is pulse 41 appearing in the output of receiver 26, Fig. 1, and converting this time into linear distance, it becomes necessary to devise some circuit for measuring this time interval by some electrical means in the range unit 34. This is accomplished by utilizing pulse 4—1 for generating two time discriminating pulses 400, 402, Fig. 4, the time of their occurrence being used for measuring the previously mentioned time interval, pulse 400 being an "early gate pulse," and pulse 402 being a "late gate pulse." The gate pulses are used for selecting the signal from the desired transponder and for bracketing the selected signal 404 so that depending upon the phase or time relationship between the pulses 400, 402 and the beacon signal 404, a variable direct current potential is generated when the beacon signal shifts from its central position with respect to the gate pulses 400, 402. This variable direct current potential is used for controlling the charge on a condenser 210 (see lower right corner of range unit 34, Fig. 2), the charge existing at any given time across condenser 210 being used for measuring the range between the object and the beacon. Circuits are also provided, as mentioned previously, for identifying the beacon station to which the range is measured, for locking the range unit on the desired beacon signal, for indicating the reception of the beacon signals, for periodic scanning of the entire range, and for unlocking the range unit should it lock on an erroneous beacon signal.

Proceeding now with a more detailed description of the block diagram of the range unit, pulse 4—1 is impressed over conductor 47 on a sawtooth wave generator 200 where it is used for discharging a sawtooth generating condenser. A sawtooth wave 4—2 is impressed on a limiter 202, which is also connected to the range determining condenser 210 over a conductor 201 through a bias control tube 203, this combination being used for controlling the bias potential impressed on limiter 202. The effect of varying the biasing potential of limiter 202 is to limit the amplitude and especially the duration of a substantially rectangular wave 4—3 appearing in its output, the adjustable duration of this wave being used for determining the time of occurrence of the gate pulses 400 and 402. The rectangular wave 4—3 is impressed on a differentiating network 205 where it is transformed into positive and negative pulses 4—4. These are impressed on shaping amplifiers 207 where the positive pulse is eliminated and the negative pulse is transformed into a rectangular pulse 4—7. This is impressed on a blocking oscillator 209 which generates an early gate pulse 4—10 including positive and negative half-cycles. Because of the fact that the positive half-cycle of the gate pulse 4—8 (as they appear in the Figs. 3 and 4) is used for timing the second blocking oscillator 212, the negative half-cycle of a 4—9 pulse, appearing in the output of oscillator 212, lags the negative portion of pulse 4—3, the difference in time of occurrence of the negative portions of these two pulses being used to obtain the time discriminating characteristic of the early and late gate pulses 4—10 and 4—11. The outputs of the oscillators are impressed over conductors 214 and 216 on early and late gate tubes 218 and 220 respectively. The gate tubes 218 and 220 are also connected over conductor 46 to the unswitched output of the responsor 26, Fig. 1, which impresses upon them the homing signals 41, consisting of a series of signals first from antenna 27 and then from antenna 28. Normally the gate tubes are so biased that none of the signals impressed upon them by the responsor are capable of rendering them conductive except the signals which coincide with the gate signals 4—10 and 4—11. This is illustrated in Fig. 4 at 4—12 and 4—13 where the beacon signal 404 is illustrated as being symmetrically disposed with respect to the gate pulses 400 and 402. From the illustrated time relationship, one may very readily see that either a smaller or a greater portion of the beacon signal 404 may coincide in time with the gate pulses, and it is this time relationship between the gate pulses and the selected beacon signal that is used for rendering either one gate tube or the other more conductive. Assuming that the time relationship between the gate pulses and the received beacon signal is as illustrated at 4—12 and 4—13 in Fig. 4, the gate tubes 218 and 220 will be rendered equally conductive and their outputs, 4—14 and 4—15, are equal. These are impressed on diodes 222 and 224, the outputs of which include relatively long time constant integrating networks so that the potentials impressed on conductors 226 and 228 represent varying D. C. potentials controlled by the conductivities of the gate tubes 218 and 220. These D. C. potentials are used for controlling the conductivities of D. C. amplifiers 230 and 232, the outputs of which are compared in a relay 233.

The armature 231 of relay 233 normally rests in its normal neutral position, between contacts 234 and 235, since its winding normally carries no current. When the conductivities of the D. C. amplifiers are unequal, armature 231 is energized and is switched either to contact 234 or contact 235, depending upon the time relationship between the signals illustrated at 4—12 and 4—13 in Fig. 4. When armature 231 swings to contact 234, the range determining condenser 210 is gradually discharged through a grounded resistance 236, and when it is connected to contact 235 condenser 210 is charged by a source of potential 239 through resistances 237, 238, conductor 243, contact 245 and armature 244 of a relay 269, armature 244 resting on contact 245 whenever the range unit is in operation. As mentioned previously, condenser 210 is connected by means of conductor 201 to the bias control tube 203, the charge on condenser 210 controlling the biasing potential impressed on this tube and thus controlling the conductivity of tube 203. This tube is connected in series with the limiter 202, thus controlling the limiting action of limiter 202. Accordingly, depending upon the charge on condenser 210, either longer or shorter portions of the sawtooth wave 4—2 will get through the limiter 202, and depending upon this limiting action, the duration of the rectangular wave 4—3 may be varied, as indicated by an arrow. Since the lagging edge of the rectangular wave 4—3 is used for controlling the time of occurrence of the gate pulses 400 and 402, Fig. 4, it is obvious that the greater is the limiting action of limiter 202, the narrower is the rectangular wave 4—3, and as a result the closer, in terms of time, will be the occurrence of the rectangular pulses 400 and 402 with respect to the synchronizing pulse 4—1. When the occurrence of the gate pulses follows almost immediately upon the occurrence of the synchronizing pulse 4—1, the range unit indicates zero range on its range meter 32, the meter being connected to the bias control tube 203 through a vacuum tube voltmeter 215.

It has been previously mentioned that the range unit is provided with the range scanning circuit which makes the range unit scan continuously the available range so long as the system is not locked on any particular beacon signal. The range scanning circuit includes an automatic range scanning unit 248, a relay 250, whose armature 251 is connected to condenser 210 over conductor 201, and a grounded contact 252. Normally the scanning unit 248 is nonconductive, there is no current in the winding of relay 250, and armature 251 rests in its neutral position or on the isolated contact. When condenser 210 accumulates its maximum positive charge because of the positive potential impressed upon it by the source of potential 239 through resistors 241, 242, contact 246 and armature 244, armature 244 making contact with contact 246 as long as the range unit remains in its range scanning position, the scanning unit 248 is rendered conductive thus energizing relay 250 which connects armature 251 to the grounded contact 252, and condenser 210 becomes immediately discharged to ground. This continuous cycle, including gradual charging of condenser 210 and its instantaneous discharge by the scanning unit 248, produces continuous scanning of the available range, the gate pulses 400 and 402 being gradually moved from their maximum range position to the zero range position, and returned again to the maximum range position when condenser 210 is discharged. The automatic range scanning cycle continues until the gate tubes 218 and 220 find a beacon signal whereupon they energize the signal channel 260 which terminates the scanning cycle.

The signal channel includes a first amplifier 262, a second amplifier and clipper 263, a signal diode 264, an integrating network 265—266, a D. C. amplifier 267, a relay 269 with two armatures 244, 272, and a grounded source of potential 270. The connections of armature 244 have been described already. Armature 272 is connected to a grounded source of potential 273, and contact 274 of this armature is connected to a grounded light 275. The first amplifier 262 of the signal channel is connected to the outputs of the gate tubes 218 and 220 so that the signals impressed upon it are the two portions 4—14 and 4—15 of the beacon signal selected by the gate tubes. The selected beacon signal, upon being amplified and shaped at 263 and 264, is impressed on the long time constant integrating network 265—266, the latter being so adjusted that it is capable of rendering the normally conductive D. C. amplifier 267 nonconductive only upon the reception of several beacon signals. When this is the case, relay 269 becomes deenergized and armature 244 is transferred from contact 246 to contact 245.

The second armature 272 is also transferred from the upper contact to the lower contact 274. De-energization of armature 244 transfers control over condenser 210 to the range unit, while de-energization of armature 272 energizes light 275, the latter notifying the operator that the responsor is receiving beacon signals, and that the range unit locked itself on the beacon signal. This locked condition persists as long as the beacon signals are received by the responsor. At this instant the automatic range scanning unit 248 is rendered inoperative since condenser 210 never reaches that maximum charge which is necessary to operate the scanning unit. This result is accomplished by adjusting the resistances 241 and 242 so that the charge accumulated by condenser 210 during the searching cycle reaches a slightly higher value than the one normally encountered in the automatic ranging cycle.

The output of the second amplifier 263 is also connected to a code channel 278. The purpose of this channel, as mentioned previously, is for indicating the beacon identifying code combinations transmitted by the beacon station. Since in the systems of this type it is quite customary to have a plurality of beacon stations for indicating various routes, it becomes necessary to identify the stations by grouping the transmitted pulses into the code combinations. This channel includes a code diode 276, an integrating network 277—271, a D. C. amplifier 279, a relay 280, and a light 281, the constants of the integrating network being adjusted to follow the code combinations transmitted by the responsor. These are impressed on the D. C. amplifier 279, relay 280, and light 281, the latter furnishing visual indications of the code combinations transmitted by the beacon. The code signals apprise the operator of the identity of the transponder, and as to whether or not the range unit has locked itself on the desired beacon signal.

If the code combination received by the code channel indicates that the range unit has locked itself on an undesired beacon signal, the operator closes a push button 283 which energizes relay 282. This relay is equipped with two armatures 284 and 285, which shunt the integrating networks in the signal and code channels. Short circuiting of the integrating networks energizes the relays 269 and 280, extinguishing light 281 and transferring armature 244 from contact 245 to contact 246. Armature 244 connects condenser 210 again to the automatic range scanning unit 248 which results in the resumption of the scanning cycle of the range unit until it locks itself once more on the beacon signal from the desired beacon station.

Proceeding now with the description of the block diagram of the azimuth unit 33, it begins with a mixer amplifier 286, connected to the outputs of the blocking oscillators 209 and 212 which impress the gate pulses 4—10 and 4—11 on the mixer. The output signal 286' of the mixer is impressed on an amplifier 287 which impresses its output signal 287' on left and right homing signal selectors 288 and 289. The selectors are also connected over the conductors 42 and 44 to cam switch 40, these conductors impressing the output of the right antenna 28 on selector 288, and the output of the left antenna 27 on selector 289. The selectors are normally biased beyond cut-off so that all signals, except those which are impressed simultaneously with the signal 287', are blocked. Therefore, the positive signal 287' is used in the azimuth unit for selecting the desired beacon signal, all other beacon signals and all interference signals being blocked. The selected beacon signal is impressed on left and right diodes 290 and 291, and integrating networks in their output circuits. The time constants of the networks are sufficiently large so as to integrate the beacon signals and transform them into varying direct current potentials corresponding to the amplitudes of the beacon signals as they appear in the two channels. These varying D. C. potentials are impressed on D. C. amplifiers 292, 293, forming a normally balanced output circuit, the azimuth meter 31 being connected across it. Since the potential appearing across this balanced circuit is controlled by the relative amplitudes of the lobe components of the beacon signal as received by the left and right antennas, it follows that the meter will indicate the degree as well as the direction of deviation of the mean lobe axis from its normal position with respect to the incoming wave-front of the beacon signal.

The responsor is also equipped with the A. V. C. unit 39, which controls the sensitivity of the receiver by means of the selected beacon signal, all other signals impressed on the responsor having no effect on its A. V. C. unit. To accomplish this result, the outputs of the selectors 288 and 289 are connected to A. V. C. diodes 295 and 296, and the ouputs of these diodes are combined in an A. V. C. amplifier 297. The output of the latter is impressed on an A. V. C. tube 298, the cathode-anode circuit of which is interposed between the positive source of potential (illustrated at "+B" in the figure) and the screen grids of the R. F. and I. F. stages of receiver 26. Since only the selected beacon signal appears in the output of the selectors, it is obvious that the sensitivity of the receiver will be under continuous control of only the selected beacon signal.

Referring to Fig. 3, synchronizing pulse 4—1 is impressed on the control grid of a triode 300 over conductor 47, this triode, in combination with a condenser 301, comprising the previously mentioned sawtooth oscillator 200. Triode 300 discharges condenser 301 when the positive synchronizing pulse 4—1 is impressed on its control grid, and, after being discharged, it resumes its charging period, the voltage across this condenser rising to the full +B potential connected to the positive potential bus 304. The resulting sawtooth wave 4—2 is impressed on the control grid of a pentode limiter 302 which is used for transmitting varying portions of the sawtooth wave impressed upon it. The cathode of pentode 302 is connected to the plate of a bias control triode 303, the cathode of this triode being grounded through a cathode resistor 305. The grid of triode 303 is connected to the range measuring condenser 210 which corresponds to the condenser similarly numbered in Fig. 2. The additional circuits which are also connected to the upper plate of condenser 210 will be described later. Suffice it to say at this instant, that the potential across condenser 210 controls the conductivity of triode 303 since the control grid of the latter is directly connected to the upper plate of this condenser. The conductivity of triode 303 and the IR drop across cathode resistor 305, therefore, determine the cathode potential of pentode 302 since its cathode is connected to ground through triode 303 and resistor 305. Depending upon the potential impressed on the cathode of pentode 302, it may be made to transmit varying amplitudes of the sawtooth wave 4—2 as indicated in Fig. 4 at 4—3, the amplitude and duration of wave 4—3 being controlled by the charge on the range measuring condenser 210. The approximately rectangular wave 4—3, is impressed on a differentiating condenser-resistance combination 306—307 which impresses positive and negative pulses 4—4 on the control grid of a normally conductive triode 308 which inverts the negative portion of signal 4—4 and attenuates the positive pulse as illustrated at 4—5. This signal is impressed on the control grid of a shaping amplifier 309 which is over-driven by the positive portion of signal 4—5, the negative portion of the latter being completely eliminated, as illustrated at 4—6. The rectangular pulse 4—6 is impressed on an inverter triode 310 which impresses its output 4—7 on the control grid of a blocking oscillator 312. The oscillator includes a three-winding, iron-core, transformer 313 whose primary connects the plate of tirode 312 to a source of potential +B, a secondary 314 connected to the grid of triode 312 through a resistance-condenser combination 315—316 and to a biasing source 321, through a rheostat, and a secondary 318, the latter representing the main output circuit of the oscillator. The resistance-condenser combination 315—316, the biasing potential 321, and the rheostat are so adjusted that the signal appearing in the primary is only a single asymmetric cycle 4—8, consisting of a negative pulse and a partially suppressed positive pulse, the oscillation being blocked upon the cessation of the positive pulse. Blocking oscillators of this type are known in the art, and are described in "Electron Optics in Television." p. 255, by I. G. Maloff et al. (1938), and, therefore, need no additional description. The plate output of the blocking oscillator is connected through a conductor 319 and a condenser 320 to the grid of a second blocking oscillator 322, identical to oscillator 312, oscillator 312 providing the positive excitation pulse for oscillator 322. Since the control grid of oscillator 322 is connected to the plate of oscillator 312, and since positive voltage signal initiates the oscillations, the beginning of the oscillatory cycle 4—9 in triode 322 will coincide with the positive portion, or second half, of cycle 4—8, and as a result the oscillatory cycle 4—9 will lag the oscillatory cycle 4—8, the negative portion of cycle 4—9 coinciding with the positive portion of cycle 4—8, as illustrated more clearly in Fig. 4. The signals 4—8, 4—9 are inverted by the transformers 313 and 317 and impressed as time-discriminating and gate pulses 4—10 and 4—11 on the suppressor grids of pentodes 324 and 326 respectively, these pentodes corresponding to the gate tubes 218 and 220 in Fig. 2. The pentodes 324 and 326 are normally biased to the point beyond cut-off and, therefore, the signals impressed upon the control grids of these pentodes through the conductors 46, 329, and a coupling condenser 335 are blocked, and only the signals which coincide in time with the appearance of the positive grid pulses 4—10 and 4—11, can get through the pentodes. The pulses 4—10 and 4—11, therefore, act as the gating, or signal selecting pulses and at the same time as the time discriminating pulses rendering the pentodes responsive only to the desired beacon signal and also sensitive to the time of arrival of the beacon signal, as explained previously in connection with the oscillograms 4—12 through 4—15. The duration of the time discriminating pulses 4—10 and 4—11 is adjusted so as to make them approximately twice as long as the duration of the beacon signal so that the resultant signals impressed on the pentodes 324 and 326 appear as those illustrated at 4—12 and 4—13. The amplitudes as well as the duration of the pulses 4—14, 4—15, appearing in the outputs of the pentodes are identical and represent "on range" condition of the system, the range meter 32 indicating the true range to the beacon station at this instant. The outputs of the pentodes 324 and 326 are impressed on the diodes 327 and 328 which have integrating resistance-condenser combinations 329—330 and 331—332 in their outputs so that the effect of the pulses 4—14 and 4—15 is to produce varying D. C. potentials across the networks, these potentials being impressed on the control grids of D. C. amplifiers 334 and 336, thus controlling the conductivities of these amplifiers. The outputs of the D. C. amplifiers are impressed on the windings of the differential, neutral relay 233, the functioning of which has been described already in connection with Fig. 2.

In order to complete the description of the operating cycle of the range unit, it remains only to describe the effect produced by switching armature 231 either to contact 234 or contact 235. It may be recalled from the previously given description of Fig. 2 that when the range unit is in operation, armature 244 rests on contact 245, connecting condenser 210 to armature 231. Since condenser 210 is connected directly to the control grid of the bias control tube 303, it is obvious that the conductivity of this tube will depend on the charge appearing across this condenser, triode 303 reaching its maximum conductivity when condenser 210 accumulates maximum charge. Since triode 303 is connected in series with pentode 302, and especially with the cathode of pentode 302, any increase in current in triode 303 impresses a positive potential on the cathode of pentode 302, so that the blocking effect of pentode 302 increases. Accordingly, smaller portions of the sawtooth wave 4—2 will appear in the output of pentode 302, thus shortening the rectangular wave 4—3, which results in shortening of that interval of time which exists between the synchronizing pulse 4—1 and the time discriminating pulses 400 and 402. This action takes place when the homing signal 404 reaches the homing receiver 26 in shorter intervals of time, which takes place when the distance between the interrogator and the transponder is continuously decreasing. Under such conditions relay 233 will hold its armature against contact 235, thus charging condenser 210 to a higher potential, this potential continuously matching in electrical terms the distance existing between the interrogator and the transponder. Should the rate of charging of condenser 210 exceed the rate of decrease in the range distance, the armature of relay 233 will be immediately operated to its contact 234, thus adjusting the charge on condenser 210 to a slightly lower valve and preventing high range readings on meter 32.

The range meter 32 is connected in the plate circuit of a triode 340, which is the vacuum tube voltmeter 215 previously described in connection with Fig. 2. The grid of triode 340 is connected to cathode 305, while its cathode is connected to an adjustable potentiometer resistance 342. This resistance is connected to a source of potential 344, the setting of the potentiometer arm 343 being so adjusted as to keep triode 340 normally nonconductive when condenser 210 finds itself in a discharged condition. The normal biasing potentials of triode 303 and pentode 302 are so adjusted by means of resistor 305 that the two tubes are slightly conductive even when condenser 210 is in a discharged condition. This impresses positive potential on the grid of triode 340, and the setting of the potentiometer arm 343 is adjusted so as to counteract the positive potential impressed on the grid.

The connections of a pentode 348, which represents the automatic range scanning unit 248 in Fig. 2, are identical to the connections of the vacuum tube voltmeter triode 340. The setting of the potentiometer arm 350 is adjusted so as to keep pentode 348 nonconductive even when condenser 210 accumulates considerable positive charge and to make it conductive only when the charge on condenser 210 reaches its maximum value. When this is the case, the resulting plate current energizes relay 250, which at once transfers its armature to contact 252, thus discharging condenser 210 to ground. This is the previously described automatic range scanning cycle of the system. As mentioned previously, the scanning unit remains inoperative when control over the system is transferred to the range unit. This is accomplished by adjusting the setting of the potentiometer 350 so that a slightly higher potential is required for making pentode 348 conductive than the range of potentials to which condenser 210 is exposed during the operation of the range unit.

It has been previously mentioned that armature 244 normally rests on contact 246 which corresponds to the scanning position of the meter, condenser 210 being periodically charged and discharged by pentode 348 when it is connected to this circuit. In order to transfer control over the meter circuit from the searching circuit to the range measuring circuit, it is necessary to transfer the position of armature 244 from its contact 246 to contact 245, thus connecting this armature in series with armature 231, the latter being controlled by the range unit. In order to accomplish this transfer, triodes 352, 354 are connected with their grids to the outputs of the gate tubes 324, 326 respectively, the triodes being normally conductive. When the negative pulses 4—12 and 4—13 are impressed on the control grids of the triodes, they are rendered less conductive with the result that a positive voltage pulse 355 appears in their combined output circuit. This is impressed on the control grid of a triode 356 which amplifies them and impresses them as a negative signal 357 on the cathode of a dual diode 358, rendering this dual diode conductive. The plates of the diode are connected to the integrating networks 277—271, 265—266 and to the grids of triodes 364, 366, these grids being held at zero bias by a biasing battery 367 to keep the triodes 364, 366 normally conductive. The functioning of these resistor-condenser combinations, as well as the functioning of the relays 280 and 269, has been already given in connection with Fig. 2, and therefore, need not be repeated here. Suffice it to say that the negative signals impressed on the grids of the triodes 364 and 366 make them nonconductive, and because of the relatively low time constant of the resistor-condenser combination 271—277, and because relay 280 is a fast acting relay, it follows the code combinations and energizes and deenergizes light 281, giving the operator a visual indication of the code combinations transmitted by the beacon station. Because of the large time constant of the resistor-condenser combination 265—266, triode 366 is rendered less conductive only upon the reception of several beacon signals 359, whereupon the armature 244 is transferred from contact 246 to contact 245, thus transferring control over condenser 210 to the range unit. The functioning of the push button station 283 has been already given in connection with Fig. 2 and, therefore, needs no additional description; as it may be recalled from the description in Fig. 2, it is used for shorting the resistor-condenser combinations in the code and signal channels for the resumption of the scanning cycle.

Summarizing the functional cycle of the ranging circuit, when the system does not receive any beacon signals from the beacon station, because of the fact that armature 244 rests on contact 246, condenser 210 is connected to the automatic range scanning unit 248 so that the needle of the range meter continues to travel from its normal maximum range position to the zero range position searching for the beacon signal. The searching cycle repeats itself continuously until the system receives the beacon signal, this cycle being made possible because of the periodic charging of condenser 210 by the source of potential 239 through the resistances 241 and 242, and periodic discharge of the same condenser to ground over armature 251 of relay 250. During the charging cycle of condenser 210, triode 303 becomes more and more conductive, the conductivity of this triode following the potential existing across condenser 210 at any given time. Since triode 303 and the cathode resistor 305 are connected in series with pentode 302, and since the increased conductivity of triode 303 impresses positive potential on the cathode of pentode 302, progressively shorter portions of the sawtooth wave 4—2 get through pentode 302. Therefore, the time discriminating signals 400 and 402 will travel to the left in Fig. 4, which is equivalent to the automatic scanning of the entire range of the system, the scanning being accomplished from the maximum range to the zero range. When the zero range is reached, condenser 210 is discharged and the cycle repeats itself once more. When a beacon signal is intercepted during this searching period, it is immediately impressed on the integrating condenser-resistance combination 266—265, and if the beacon signals are received in succession during several scanning cycles, the integrating network receives sufficient amount of charge to deenergize relay 269. This at once transfers armature 244 to contact 245, which in turn interrupts the original searching cycle and transfers the control over condenser 210 to the automatic ranging unit. From then on relay 233 controls the charge impressed on condenser 210 and this charge, in turn, is used for controlling the conductivities of the triodes 303 and 340; relay 233 keeps the time discriminating signals 400, 402 in alignment with the desired beacon signal, while condenser 210 controls the potential impressed on the range meter 32.

Proceeding now with the description of the automatic azimuth circuit, it begins with a dual triode 367 whose grids are connected to the secondary windings 318 and 323 respectively of the transformers 313 and 317. It may be recalled that these transformers are connected to the output circuits of the blocking oscillators 312, 322, which generate the time discriminating signals 400, 402 used for determining the time of arrival of the beacon signal 404. The signals 4—10, 4—11 are combined in the plate circuits of triode 367 and are impressed as a negative signal 368 on the control grid of a normally conductive inverter triode 369 so that a positive signal 370 is impressed on the suppressor grids of pentodes 371 and 372. These pentodes are normally biased to block all video signals impressed on their control grids by responsor 26 over the conductors 42, 44, except the signals impressed upon them simultaneously with signal 370. Therefore, pentode 371 transmits the desired beacon signal as received by antenna 28, while pentode 372 transmits the same beacon signal as received by antenna 27. Since the function performed by the azimuth circuit resides in the comparison of the amplitudes of the beacon signals as received by the two antennas, it is obvious that the function of the pentodes 371 and 372 is to select the desired beacon signal with the aid of the gate pulse 370, and, when such selection is accomplished, to impress them on an amplitude comparison circuit. The latter consists of diodes 376, 378, and D. C. amplifiers 380, 382. The cathodes of the diodes 376, 378 are connected to the plates of the pentodes 371 and 372, which impress upon them the selected beacon signals 375 and 377 respectively, the negative portions of the signals making the diodes conductive. The signals appearing in the plate circuits of the diodes are impressed on the integrating networks 379—381 and 383—384, where the produce varying direct current potential which are used to control the conductivities of the D. C. amplifiers 380 and 382. The outputs of the D. C. amplifiers appear across the plate resistors 385 and 386 and the azimuth meter 31 is connected across them, the meter itself being shunted by a filter condenser 387.

The operation of the azimuth unit should be apparent from the description given thus far, and, therefore, only a brief summary of its operating cycle will be given here. Two time discriminating signals 4—10 and 4—11 are used for generating a beacon selecting pulse 370 which is impressed on the gate tubes 371 and 372 where selection of the desired beacon signal is accomplished, the gate tubes being connected to the output of the responsor in such a manner that only signals from one antenna are impressed on each gate tube. Thus two parallel channels are formed in the azimuth unit, the lobe components of the selected beacon signal from one antenna appearing in one channel and the lobe components from the other antenna appearing in the other channel. The amplitudes of the lobe components are compared in the two balanced circuits, and the azimuth meter is connected across the two circuits so that it responds to the difference in potential appearing across the two channels. This potential difference is used to give the azimuth indications.

The A. V. C. circuit consists of a double diode 388 which is connected to the output of the gate tubes 371 and 372 by means of transformers 389 and 390 which impress the selected beacon signal on the diode. The integrated output of diode 388 appears across its cathode resistor 391, the latter being used to control the conductivity of a pentode 392. Pentode 392, in its turn, controls the conductivity of a triode 393 the cathode resistor 394 of the latter being connected by means of a conductor 396 to the screen grids of some of the IF and RF stages of the responsor. Accordingly, the positive potential impressed on the screen grids of some of the stages in the responsor depends on the conductivity of triode 393. Since the conductivity of the latter depends on the amplitude of the selected beacon signal impressed on diode 388, it follows that the sensitivity of the responsor is thus controlled by the amplitude of the selected beacon signals.

It should be understood that while I have shown simple triodes in some parts of the schematic diagram, in actual practice the tubes may have a larger number of elements, and may be replaced with pentodes or other multiple element tubes having greater efficiency when used with the video signals encountered in the illustrated system.

An additional modification may involve the elimination of the blocking oscillator 322 since the second gate pulse may be obtained from the blocking oscillator 312 by impressing the output signal 4—10 of oscillator 312 on a delayed line, and the output of the latter on the gate tube 326.

It is believed that the construction and operation of the range and azimuth units and the auxiliary channels connected to them will be apparent from the foregoing description. It should, therefore, be understood that while I have shown and described the invention in the preferred form, many changes and modifications may be made without departing from the spirit of the invention as sought to be defined in the following claims.

I claim:
1. In an interrogator-responsor-transponder system, a range measuring unit for determining range between said interrogator-responsor and said transponder, said unit comprising a sawtooth voltage wave generator connected to said interrogator, an adjustable limiter connected to said generator, said limiter transmitting variable portions of said voltage wave, depending upon the biasing potential impressed on said limiter, a network having two parallel channels connected to said limiter for generating an early gate pulse in one channel and a late gate pulse in the other channel, early and late gate tubes connected respectively to said channels and said responsor, said responsor impressing on said tubes beacon signals received from said transponder, said tubes being rendered conductive only when there is at least partial coincidence of the gate pulses and said beacon signals, a comparison circuit connected between said tubes for comparing the outputs of said tubes, a connection between the output of said comparison circuit and said limiter for adjusting the biasing potential of said limiter to keep said beacon signal symmetrically disposed with respect to said gate pulses, and a meter connected to said limiter for measuring said biasing potential, said biasing potential corresponding to said range.

2. In an interrogator-responsor-transponder system, a range measuring unit for determining range between said interrogator-responsor and said transponder, said unit including a network, connected to said interrogator, for generating an early gate pulse and a late gate pulse, early and late gate tubes connected to said network and to said responsor, said responsor impressing periodically on said tubes a beacon signal received from said transponder, said tubes being rendered conductive only when said gate pulses and said beacon signal overlap, a comparison circuit connected to said tubes for comparing the outputs of said tubes, a condenser coupled to said comparison circuit, means connected to said comparison circuit for causing the magnitude of the charge on said condenser to be representative of range, means for measuring the charge on said condenser, and electronic instrumentalities connected to said condenser and to said network for adjusting the time relationship between said gate pulses and said beacon signal so as to keep said beacon signal symmetrically disposed with respect to said gate pulses.

3. In an interrogator-responsor-transponder system, a range measuring unit for determining range between said interrogator-responsor and said transponder, said range unit comprising a voltage wave generator connected to and controlled by said interrogator, first circuits connected to said generator for transforming said wave into an early gate pulse and a late gate pulse, early and late gate tubes connected to said circuits and to said responsor, said tubes being equally conductive when a beacon signal impressed on said tubes by said responsor is partially lagging said early gate pulse and partially leading said late gate pulse by equal parts, two parallel channels connected to said tubes, said channels terminating in a common output circuit capable of generating a reversible direct current potential, depending upon the time relationship between said beacon signal and the gate pulses, a relay connected across said common circuit, and a condenser connected to said relay and said first circuits, circuits connected to said relay for controlling the charge on said condenser so as to hold it continuously substantially at a value corresponding to the range of said beacon signal, and the charge on said condenser controlling the timing of said pulses to maintain said equal lagging and leading relationship between said beacon signal and said gate pulses.

4. In an interrogator-responsor-transponder system as defined in claim 3 in which said first circuits further include first and second thermionic tubes connected in series, said first tube being connected to said generator, and said second tube being connected to said condenser, said condenser controlling the bias potential of said second tube, and said second tube controlling the cathode potential of said first tube, and a meter circuit connected to said second tube for indicating said range.

5. In an interrogator-responsor-transponder system, a range measuring unit for indicating range between said interrogator-responsor and said transponder, said range unit comprising a sawtooth generator connected to said interrogator, first and second thermionic tubes connected in series, said tubes each having at least one grid, a cathode and an anode, the grid of said first tube being connected to said sawtooth generator, a condenser connected to the grid of said second tube for controlling the bias potential impressed on said second tube, and said second tube controlling the cathode potential of said first tube, a differentiating network and a shaping amplifier connected to said first tube for transforming the output of said first tube into a pulse, a first blocking oscillator connected to said shaping amplifier and controlled by said pulse, said blocking oscillator generating an early gate pulse, a second blocking oscillator connected to said first blocking oscillator, said second blocking oscillator generating a late gate pulse, two parallel channels connected to said blocking oscillators respectively, each of said channels including a gate tube connected to its blocking oscillator and to said responsor, a diode connected to each gate tube, an integrating network connected to each diode, and a direct current amplifier connected to each network, said responsor impressing on said gate tubes beacon signals from said transponder to make said tubes conductive only when the gate pulses and the beacon signal overlap, and a ranging relay connected across the outputs of the direct current amplifiers, said relay controlling the charge on said condenser, and said charge controlling the timing of said gate pulses to have equal portions of said beacon signal coincide with said gate pulses in said gate tubes.

6. In an interrogator-responsor-transponder system as defined in claim 5 which further includes a cathode resistor connected to the cathode of said second tube, and a vacuum tube voltmeter circuit connected to said cathode resistor, said voltmeter being calibrated for indicating said range.

7. In an interrogator-responsor-transponder system as defined in claim 5 which further includes a signal channel connected to said gate tubes, a signal relay in the output of said signal channel, said signal relay connecting said condenser to a source of direct current potential so long as said gate tubes are non-conductive, and connecting said condenser to said ranging relay when said gate tubes become conductive, and an automatic range scanning unit connected to said condenser for discharging said condenser when said condenser becomes fully charged by said source, the charging and discharging of said condenser constituting the range scanning cycle of said range unit.

8. An interrogator-responsor-transponder system including means for generating a gate pulse in synchronism with signals transmitted by said interrogator, means coupled to said responsor for applying to said gate generating means signals from said transponder, automatic range scanning means connected to said gate generating means for varying the time of occurrence of said gate pulse to continuously scan the entire range of said system, signal channel means coupled to the output of said gate generating means for disconnecting said automatic range scanning means from said gate generating means in response to a plurality of signals from said transponder that are coincident with said gate pulse and for locking said gate pulse upon said plurality of signals, and means for measuring the time of occurrence of said gate pulse to provide an indication of the range of said transponder from said interrogator-responsor.

9. An interrogator-responsor-transponder system as defined in claim 8 which further includes an integrating network within said signal channel means for maintaining the locking of said gate pulse so long as the plurality of transponder signals are received by said signal channel, thereby maintaining said gate pulse locked on the selected transponder signals, and manually operated instrumentalities for de-energizing said signal channel means and for reconnecting the automatic scanning means to said gate generating means.

10. In an interrogator-responsor-transponder system, said transponder transmitting beacon signals in response to interrogator pulses, an azimuth determining channel including left and right directional antennas forming an overlapping lobe pattern, said antennas being connected to said responsor through a first switch for impressing on said responsor beacon signals from the left and right antennas in alternate succession, a second switch connected to the output of said responsor, an azimuth unit including two parallel, left and right channels, said channels having on their input sides respectively left and right beacon signal selectors connected to said second switch, said first and second switches being synchronized for impressing the signals from the left antenna on said left selector and the signals from the right antenna on said right selector, a diode and an integrating network connected to each signal selector, and a direct current amplifier connected to each integrating network, a gate-generating circuit connected between said interrogator and said selectors for impressing a gate pulse on said selectors, said gate-generating circuit having means to synchronize said gate pulse with a desired beacon signal, whereby said selectors select and follow the beacon signals only from the desired transponder at any given time, and a meter connected across the outputs of the direct current amplifiers, said meter indicating the difference in the amplitude of the components of the selected beacon signal as received by said left and right antennas, said difference corresponding to the direction and the magnitude of the azimuth deviation of the mean lobe axis of said antenna from its right angle position with respect to the wave-front of the selected beacon signal.

11. In an interrogator-responsor-transponder system as defined in claim 10 which further includes an automatic volume control circuit connected between the outputs of said selectors and said responsor, said automatic volume control circuit including two diodes connected to said selectors respectively, a common amplifier connected to said two diodes, and an automatic volume control tube connected to said amplifiers, said control tube including an integrating condenser-resistance combination in the cathode circuit of said tube, and connections between said responsor and said network for controlling the sensitivity of said responsor by means of the selected beacon signals appearing in the output of said selectors.

12. In an interrogator-responsor-transponder system, an azimuth determining channel including left and right directional antennas having an overlapping lobe pattern and connected to said responsor through a first switch for impressing on said responsor the output of the left and right antennas in alternate succession, a second switch connected to the output of said responsor, an azimuth unit including left and right channels connected to said second switch, said first and second switches being synchronized for impressing the output of the left antenna on said left channel and the output of the right antenna on said right channel, each of said channels including a signal selector connected to said second switch, a diode and an integrating network connected to said signal selector, and a direct current amplifier connected to said integrating network, a range measuring unit for determining range between said interrogator-responsor and said transponder, said unit comprising a voltage wave-generator connected to said interrogator, and a network connected to said generator for generating an early gate pulse and a late gate pulse, a mixer amplifier connected between said network of said range unit and the signal selectors of said azimuth channel, said mixer combining said early and late gate pulses, and thereby generating a beacon signal selecting pulse for making said selectors select beacon signals from a single transponder at any given time, and a meter connected across the output of said direct current amplifiers for indicating the difference in the amplitude of the components of the selected beacon signal as received by said left and right antennas, said meter indicating the direction and the magnitude of the azimuth deviation of the mean lobe axis of said overlapping lobe antenna from its right angle position with respect to the wave-front of the selected beacon signal.

KENNETH W. NIGHTENHELSER.

REFERENCES CITED

The following references are of record in the file of this patent:

UNITED STATES PATENTS

| Number | Name | Date |
|---|---|---|
| 1,806,577 | Kolster | May 19, 1931 |
| 1,924,174 | Wolf | Aug. 29, 1933 |
| 2,134,716 | Gunn | Nov. 1, 1938 |
| 2,208,349 | Ulbricht | July 16, 1940 |
| 2,427,029 | Stearns | Sept. 9, 1947 |
| 2,427,220 | Luck | Sept. 9, 1947 |
| 2,433,341 | Busignies | Dec. 30, 1947 |
| 2,433,667 | Hollingsworth | Dec. 30, 1947 |
| 2,445,584 | Ramo | July 20, 1948 |
| 2,453,970 | Charrier | Nov. 16, 1948 |
| 2,455,265 | Norgaard | Nov. 30, 1948 |
| 2,459,811 | Grieg | Jan. 25, 1949 |
| 2,466,711 | Kenyon | Apr. 12, 1949 |
| 2,467,208 | Hahn | Apr. 12, 1949 |
| 2,495,753 | Mozley | Jan. 31, 1950 |
| 2,515,178 | Barchok | July 18, 1950 |
| 2,543,072 | Stearns | Feb. 27, 1951 |

FOREIGN PATENTS

| Number | Country | Date |
|---|---|---|
| 116,666 | Australia | Oct. 10, 1941 |